Oct. 7, 1941.  A. M. WOLF  2,257,772

MOTOR VEHICLE PROPULSION

Original Filed April 7, 1932

INVENTOR.
Austin M. Wolf,
BY M. C. Lyddane
ATTORNEY

Patented Oct. 7, 1941

2,257,772

UNITED STATES PATENT OFFICE 2,257,772

MOTOR VEHICLE PROPULSION

Austin M. Wolf, Plainfield, N. J.

Original application April 7, 1932, Serial No. 603,701. Divided and this application October 10, 1938, Serial No. 234,264

5 Claims. (Cl. 180—54)

This invention relates to motor vehicle propulsion, and, generically considered has for its object and purpose to provide a novel arrangement of one or more power plants or motors together with means for economically and efficiently transmitting the developed power to the front or rear vehicle axles or to both of said axles. The subject matter of the present application constitutes a division of an application for patent filed by me on April 7, 1932, Ser. No. 603,701 now Patent No. 2,132,450 dated October 11, 1938.

A more particular object of the invention is to provide a tandem arrangement of the engines at either the front or rear ends of the vehicle or midway of its length and transmitting the power developed by each engine to one or both axles through a transmission means which is common to both engines.

With the above and other objects in view, the invention consists in the improved motor vehicle propulsion means and in the form, construction and relative arrangement of the various parts thereof as will hereinafter be more fully described, illustrated in the accompanying drawing and subsequently incorporated in the subjoined claims.

Referring to the drawing in which I have disclosed several simple and practical embodiments of the invention and wherein similar reference characters designate corresponding parts throughout the several views.

Figure 1:
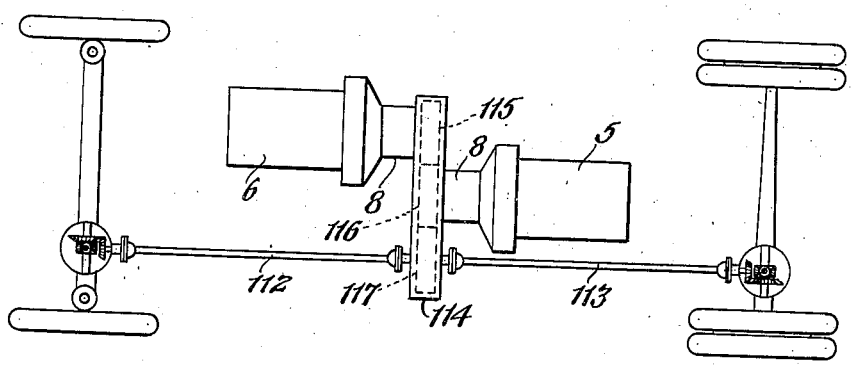
Fig. 1 is a diagrammatic plan view showing a tandem mounting or arrangement of the engines or motors with common power transmission means to the front and rear axles.

In Fig. 1 of the drawing I have illustrated an embodiment of the invention in which two internal combustion engines 5 and 6, respectively, are disposed in reversed longitudinally spaced apart relation and substantially equi-distantly spaced from the respective front and rear vehicle axles with their crank shafts out of alignment with each other. To the opposing ends of these engines the change speed gear boxes 8, individual to the respective engines, are suitably fixed with the opposing ends of said gear boxes disposed in spaced apart relation transversely of the vehicle. A transfer gear case 114 disposed transversely of the vehicle bridges the space between the ends of said gear boxes and is directly and rigidly joined thereto.

Owing to the reversed positions of the engines, the directly meshing power transfer gears 115 and 116 may be employed with conventional engines rotating in the same direction. The final gear 117 in the transfer case 114, which is in mesh with the gear 116, transmits the power through propeller shafts 112 and 113 to the respective front and rear vehicle axles. This arrangement therefore, provides an offset drive for the vehicle at one side of its longitudinal center line.

Figure 2:
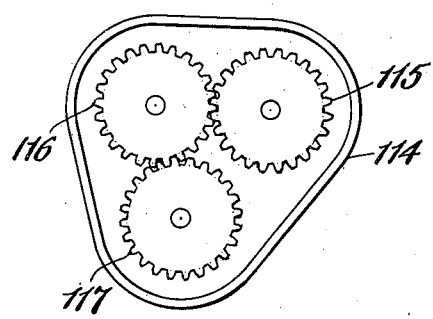
Fig. 2 is a side elevation of the transfer gear case showing a slightly modified arrangement of the power transmission gears.

However, if desired, as indicated in Fig. 2 of the drawing, a central arrangement of the propeller shafts and axle differentials may be employed by disposing the gear 117 below the gear 116 in mesh therewith, but in clearance relation with the gear 115.

Figure 3:
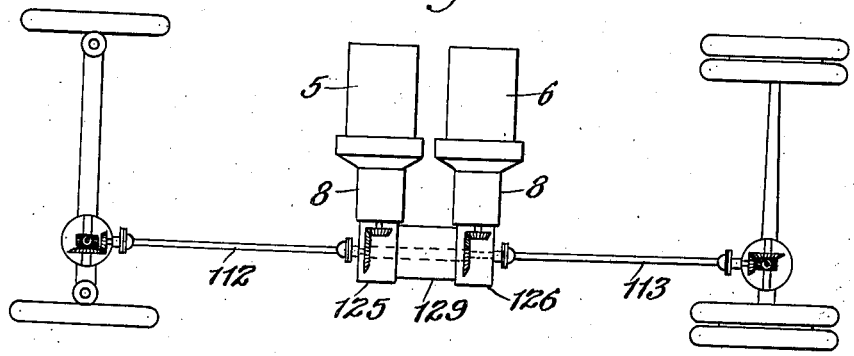
Fig. 3 is a diagrammatic plan view illustrating another alternative arrangement of the power plant with propelling connections with the vehicle axles.

In Fig. 3 I have shown an alternative arrangement of the several power plant units in which the engines 5 and 6 are arranged in spaced apart relation longitudinally of the vehicle at one side of the longitudinal center line and with their crank shafts disposed in transverse parallel relation. The individual change speed gear boxes 8 are fixed to the inner ends of the respective engines and the spaced apart ends of these gear boxes are bridged by the transfer gear case 129, the ends 125 and 126 of which are directly and rigidly united with said ends of the gear boxes 8. The same offset propeller shaft connections between the transfer gear case and the differentials of the vehicle axles are employed, as in Fig. 1.

In the drawing and the above description, I have disclosed arrangements of the power plants with the variable speed and transfer gear units located substantially centrally between the vehicle axles. In many cases, this is desirable in order to obtain better distribution of the dead weight load upon the vehicle wheels. However, I do not regard the invention as necessarily limited in this respect, since it is apparent that the power plant will function with the same efficiency when arranged adjacent to either the front or rear axle of the vehicle. It is also obvious that instead of providing power transmitting connections with both axles of the vehicle, such connections may be provided between the power transfer gearing and a single wheel axle.

From the foregoing description considered in connection with the accompanying drawing, the numerous advantages of the described embodiments of my present invention will be clearly understood. Although I have described the invention principally in its application to a motor vehicle bus or coach, it will be understood that the novel features thereof are of general application to trucks and passenger cars as well. While I have disclosed a number of simple and practical examples of my present improvements, it is to be understood that such disclosures are largely illustrative, and that the essential features of the invention might also be exemplified in numerous other alternative arrangements. Accordingly I reserve the privilege of resorting to all such legitimate changes in the form, construction and relative arrangement of the various elements, as may fairly be comprehended within the spirit and scope of the appended claims.

I claim:

1. In a motor vehicle, front and rear axles, a pair of engines mounted between the axles in reversed longitudinally spaced apart relation, change speed gear boxes on the opposing ends of said engines, a transversely positioned power transfer gear case connecting said gear boxes with each other, and propeller shafts connecting said gear case with each of the vehicle axles.

2. In a motor vehicle, front and rear axles, a pair of engines mounted between and in equidistantly spaced relation from the respective axles with their crank shafts disposed in spaced apart parallel relation, individual variable speed gearing for the engines and spaced apart gear boxes therefor directly joined at one of their ends with the respective engines, a transfer gear case bridging the space between the other ends of the gear boxes and rigidly connecting the same with each other, and propelling means connecting said gear case with one of the vehicle axles.

3. In a motor vehicle, a driving axle, a pair of engines mounted respectively on opposite sides of the longitudinal center line of the vehicle in reversed longitudinally spaced apart relation, a change speed gear box for each engine, a transfer gear case directly and rigidly connecting said gear boxes with each other, and a propeller shaft connecting said gear case with the vehicle driving axle.

4. In a motor vehicle, a driving axle, a pair of engines mounted respectively on opposite sides of the longitudinal center line of the vehicle in reversed longitudinally spaced apart relation, change speed gear boxes fixed to the opposing ends of said engines, a transfer gear case bridging the space between said gear boxes and rigidly joined therewith, and power transmitting connections between said transfer gear case and the vehicle driving axle.

5. In a motor vehicle, a driving axle, a pair of engines spaced apart longitudinally of the vehicle with their crank shafts disposed in parallel relation transversely thereof, individual spaced apart change speed gear boxes fixed to the corresponding ends of said engines, a transfer gear case, disposed longitudinally of the vehicle, bridging the space between said gear boxes and rigidly joined therewith, and power transmitting connections between said transfer gear case and the vehicle driving axle.

AUSTIN M. WOLF.